(12) United States Patent
Kameyama et al.

(10) Patent No.: US 10,457,764 B2
(45) Date of Patent: Oct. 29, 2019

(54) MODIFIED HYDROCARBON RESIN AND HOT MELT ADHESIVE COMPOSITION

(71) Applicant: ZEON CORPORATION, Chiyoda-ku, Tokyo (JP)

(72) Inventors: Ryoji Kameyama, Tokyo (JP); Sadaharu Hashimoto, Tokyo (JP)

(73) Assignee: ZEON CORPORATION, Chiyoda-ku, Tokyo (JP)

( * ) Notice: Subject to any disclaimer, the term of this patent is extended or adjusted under 35 U.S.C. 154(b) by 0 days.

(21) Appl. No.: 16/086,382

(22) PCT Filed: Mar. 31, 2017

(86) PCT No.: PCT/JP2017/013649
§ 371 (c)(1),
(2) Date: Sep. 19, 2018

(87) PCT Pub. No.: WO2017/171025
PCT Pub. Date: Oct. 5, 2017

(65) Prior Publication Data
US 2019/0100612 A1    Apr. 4, 2019

(30) Foreign Application Priority Data

Mar. 31, 2016 (JP) .................................. 2016-069893

(51) Int. Cl.

| | |
|---|---|
| *C08F 8/04* | (2006.01) |
| *C08F 236/04* | (2006.01) |
| *C09J 11/06* | (2006.01) |
| *C09J 11/08* | (2006.01) |
| *C09J 153/02* | (2006.01) |
| *C09J 201/00* | (2006.01) |
| *C09J 7/35* | (2018.01) |
| *C08F 212/08* | (2006.01) |
| *C08K 5/3435* | (2006.01) |

(52) U.S. Cl.
CPC ............ *C08F 236/045* (2013.01); *C08F 8/04* (2013.01); *C08F 212/08* (2013.01); *C08F 236/04* (2013.01); *C08K 5/3435* (2013.01); *C09J 7/35* (2018.01); *C09J 11/06* (2013.01); *C09J 11/08* (2013.01); *C09J 153/02* (2013.01); *C09J 201/00* (2013.01); *C08F 2500/02* (2013.01); *C08F 2500/03* (2013.01)

(58) Field of Classification Search
CPC ........ C08F 236/045; C08F 8/04; C09J 109/00
See application file for complete search history.

(56) References Cited

U.S. PATENT DOCUMENTS

| | | | |
|---|---|---|---|
| 5,491,214 A * | 2/1996 | Daughenbaugh | C08F 8/04 528/483 |
| 6,605,680 B1 * | 8/2003 | Donker | C08F 236/045 526/207 |
| 2018/0258198 A1 * | 9/2018 | Hashimoto | C09J 147/00 |

FOREIGN PATENT DOCUMENTS

| | | |
|---|---|---|
| EP | 0725087 A1 | 8/1996 |
| JP | 3971468 B2 | 9/2007 |
| JP | 3987587 B2 | 10/2007 |
| JP | 2014-198806 | * 10/2014 |

OTHER PUBLICATIONS

Translation of JP 2014-198806 (Year: 2014).*
Oct. 2, 2018, International Preliminary Report on Patentability issued in the International Patent Application No. PCT/JP2017/013649.

* cited by examiner

*Primary Examiner* — Robert C Boyle
(74) *Attorney, Agent, or Firm* — Kenja IP Law PC

(57) ABSTRACT

Provided is a modified hydrocarbon resin that provides a hot melt adhesive composition with low odor, excellent heat stability, and high adhesive properties. The modified hydrocarbon resin is obtained by hydrogenating a hydrocarbon resin comprising a plurality of specific monomeric unit in a specific range, and characterized in that: a degree of hydrogenation of the olefins, a degree of hydrogenation of the aromatic rings, a weight average molecular weight (Mw), a Z-average molecular weight (Mz), a ratio (Mz/Mw) of the Z-average molecular weight to the weight-average molecular weight, a Gardner color scale of a toluene solution of 50 mass %, and a difference between pre-hydrogenation and post-hydrogenation mixed aniline point (MMAP) are within the specific range.

6 Claims, No Drawings

US 10,457,764 B2

MODIFIED HYDROCARBON RESIN AND HOT MELT ADHESIVE COMPOSITION

TECHNICAL FIELD

The present invention relates to a modified hydrocarbon resin that provides a hot melt adhesive composition with low odor, excellent heat stability, and high adhesive properties.

BACKGROUND ART

Hot melt adhesives are adhesives that are able to adhere to various products efficiently since they solidify in a short time, and are highly safe to human body since the adhesives do not require solvents. Therefore, hot melt adhesives are used in a variety of fields. For example, hot melt adhesives are commercially used as adhesives for sealing wrapping papers, packaging cardboard, and packaging films for food, clothes, electronic devices, and cosmetics; when sanitary products such as diaper and sanitary goods are produced, as an adhesive to adhere members configured therein; and as an adhesive configured in an adhesive layer of an adhesive tape and label.

Hot melt adhesives are usually produced by blending a substance such as a tackifying resin in a base polymer. In recent years, as the tackifying resin, hydrogenation of a hydrocarbon resin has been attempted from the viewpoint of improving color and odor of hot melt adhesives.

For example, it is described in Patent Literatures 1 to 2 that the color is improved by hydrogenating a hydrocarbon resin.

Also, in such a hydrocarbon resin hydride, changes in color due to factors such as deterioration by heat is less, and the odor is improved since an unsaturated bond originally included in the hydrocarbon resin is saturated by a hydrogenation reaction (hydrogenating).

CITATION LIST

Patent Literature

Patent Literature 1: Japanese Patent Publication (JP-B) No. 3971468
Patent Literature 2: JP-B No. 3987587

SUMMARY OF INVENTION

Technical Problem

However, in the modified hydrocarbon resins described in Patent Literatures 1 to 2, although the above described improvement in the color has been recognized, there remains a problem that sufficient adhesive force cannot be obtained since compatibility with the base polymer is poor.

The present invention is made in view of the above problems, and a main object of is to provide a modified hydrocarbon resin that provides a hot melt adhesive composition with low odor, excellent heat stability, and high adhesive properties.

Solution to Problem

The inventors of the present invention conducted a thorough investigation on the modified hydrocarbon resin that provides a hot melt adhesive composition with low odor, excellent heat stability, and high adhesive properties; as the result, they have found out that the hydrogenation of the hydrocarbon resin has contributed to the improvement in the odor and color, but too high degree of hydrogenation has degraded compatibility with the base polymer, and thereby the present invention has been completed.

Thus, according to the present invention, provided is a modified hydrocarbon resin obtained by hydrogenating a hydrocarbon resin comprising: a 1,3-pentadiene monomeric unit of 20 mass % to 70 mass %, a $C_{4-6}$ alicyclic monoolefin monomeric unit of 10 mass % to 35 mass %, a $C_{4-8}$ acyclic monoolefin monomeric unit of 5 mass % to 30 mass %, an alicyclic diolefin monomeric unit of 0 mass % to 1 mass %, and an aromatic monoolefin monomeric unit of 0 mass % to 40 mass %, the modified hydrocarbon resin being characterized in that: a degree of hydrogenation of the olefins is within a range of 30% to 80%; a degree of hydrogenation of the aromatic rings, if an aromatic monomeric unit is included, is within a range of 5% to 20%; a weight average molecular weight (Mw) is within a range of 1,000 to 4,000; a Z-average molecular weight (Mz) is within a range of 2,500 to 10,000; a ratio (Mz/Mw) of the Z-average molecular weight to the weight-average molecular weight is within a range of 1.5 to 2.5; a Gardner color scale of a toluene solution of 50 mass % is 2 or lower; and a difference between pre-hydrogenation and post-hydrogenation mixed aniline point (MMAP) is 5° C. or less.

Also, according to the present invention, provided is a hot melt adhesive composition characterized by comprising: the modified hydrocarbon resin, and a thermoplastic polymer compound.

It is preferable that the thermoplastic polymer compound is a styrene-based block copolymer.

It is preferable that the hot melt adhesive composition contains a compound including a 2,2,6,6-tetraalkyl-4-piperidyl group as an antioxidant.

It is preferable that the hot melt adhesive composition contains a single perfume of which boiling point under normal pressure is 200° C. or more or a compound perfume comprising two or more kinds of the single perfume, as a perfume.

It is preferable that the hot melt adhesive composition contains an absorbent.

Advantageous Effects of Invention

The present invention exhibits an effect of providing a modified hydrocarbon resin that provides a hot melt adhesive composition with low odor, excellent heat stability, and high adhesive properties.

DESCRIPTION OF EMBODIMENTS

The present invention relates to a modified hydrocarbon resin and a hot melt adhesive composition using thereof.

The modified hydrocarbon resin and a hot melt adhesive composition of the present invention are hereinafter explained in details.

A. Modified Hydrocarbon Resin

The modified hydrocarbon resin of the present invention is obtained by hydrogenating a hydrocarbon resin comprising: a 1,3-pentadiene monomeric unit of 20 mass % to 70 mass %, a $C_{4-6}$ alicyclic monoolefin monomeric unit of 10 mass % to 35 mass %, a $C_{4-8}$ acyclic monoolefin monomeric unit of 5 mass % to 30 mass %, an alicyclic diolefin monomeric unit of 0 mass % to 1 mass %, and an aromatic monoolefin monomeric unit of 0 mass % to 40 mass %, the modified hydrocarbon resin being characterized in that: a degree of hydrogenation of the olefins is within a range of 30% to 80%; a degree of hydrogenation of the aromatic rings, if an aromatic monomeric unit is included, is within a range of 5% to 20%; a weight average molecular weight (Mw) is within a range of 1,000 to 4,000; a Z-average molecular weight (Mz) is within a range of 2,500 to 10,000; a ratio (Mz/Mw) of the Z-average molecular weight to the weight-average molecular weight is within a range of 1.5 to 2.5; a Gardner color scale of a toluene solution of 50 mass % is 2 or lower; and a difference between pre-hydrogenation and post-hydrogenation mixed aniline point (MMAP) is 5° C. or less.

According to the present invention, the degree of hydrogenation of the olefins, the weight average molecular weight (Mw), the Z-average molecular weight (Mz), the ratio (Mz/Mw) of the Z-average molecular weight to the weight-average molecular weight, the Gardner color scale, and the difference between pre-hydrogenation and post-hydrogenation mixed aniline point (MMAP) are within the above described range, in particular, the degree of hydrogenation of the olefins and the difference between pre-hydrogenation and post-hydrogenation mixed aniline point (MMAP) are within the above described range to keep the degree of modification by the hydrogenation within the specific range, so as to obtain excellent compatibility with the base polymer while also obtaining the effect of hydrogenation bringing low odor and excellent heat stability. Then, as the result of being excellent in compatibility with the base polymer, it becomes capable of providing a hot melt adhesive composition with high adhesive properties.

Here, reasons why the compatibility with the base polymer such as a styrene-based block copolymer becomes excellent by keeping the degree of modification by the hydrogenation within the specific range are presumed to be because some level of the unsaturated bond originally included in the pre-hydrogenated hydrocarbon resin is remained to maintain the compatibility with the base polymer having aromatic rings and the like.

The modified hydrocarbon resin of the present invention is obtained by hydrogenating a hydrocarbon resin.

The hydrocarbon resin before modified by hydrogenation (hereinafter it may be simply referred to as a pre-modified resin in some cases), and the modified hydrocarbon resin that is a hydrocarbon resin hydride modified the aforementioned hydrocarbon resin by hydrogenation, are hereinafter explained in details.

1. Hydrocarbon Resin

The hydrocarbon resin is a raw material resin before modified by hydrogenation comprising a 1,3-pentadiene monomeric unit of 20 mass % to 70 mass %, a $C_{4-6}$ alicyclic monoolefin monomeric unit of 10 mass % to 35 mass %, a $C_{4-8}$ acyclic monoolefin monomeric unit of 5 mass % to 30 mass %, an alicyclic diolefin monomeric unit of 0 mass % to 1 mass %, and an aromatic monoolefin monomeric unit of 0 mass % to 40 mass %.

Incidentally, the content ratio of the monomeric unit is in the same manner in the modified hydrocarbon resin, and the suitable range of the said content ratio is the same as that of the pre-modified resin.

The content of the 1,3-pentadiene monomeric unit in the pre-modified resin is in a range of 20 mass % to 70 mass %, preferably in a range of 25 mass % to 65 mass %, and above all, preferably in a range of 30 mass % to 60 mass %, and in particular, preferably in a range of 35 mass % to 55 mass %. The content is in the above described range and thus the modified hydrocarbon resin of the present invention can provide a hot melt adhesive composition with low odor, excellent heat stability, and high adhesive properties.

Incidentally, there are no particular limitations on the cis/trans isomeric ratio in the 1,3-pentadiene, and may be an arbitrary ratio.

The $C_{4-6}$ alicyclic monoolefin is a $C_{4-6}$ hydrocarbon compound having one ethyleny unsaturated bond and a non-aromatic ring structure in its molecule structure. Specific examples of the $C_{4-6}$ alicyclic monoolefin may include cyclobutene, cyclopentene, cyclohexene, methylcyclobutene, and methylcyclopentene.

The content of the $C_{4-6}$ alicyclic monoolefin monomeric unit in the pre-modified resin is in a range of 10 mass % to 35 mass %, preferably in a range of 15 mass % to 33 mass %, and above all, preferably in a range of 19 mass % to 32 mass %, and in particular, preferably in a range of 23 mass % to 31 mass %. The content is in the above described range and thus the modified hydrocarbon resin of the present invention can provide a hot melt adhesive composition with low odor, excellent heat stability, and high adhesive properties.

Incidentally, there are no particular limitations on the ratio of each compound that corresponds to the $C_{4-6}$ alicyclic monoolefin therein, and may be an arbitrary ratio; however, it is preferable that at least cyclopentene is included, and the ratio of the cyclopentene occupied in the $C_{4-6}$ alicyclic monoolefin is preferably 50 mass % or more.

The $C_{4-8}$ acyclic monoolefin is a $C_{4-8}$ chain-shaped hydrocarbon compound having one ethyleny unsaturated bond but not having a ring structure in its molecule structure. Specific examples of the $C_{4-8}$ alicyclic monoolefin may include butenes such as 1-butene, 2-butene, and isobutylene (2-methylpropene); pentenes such as 1-pentene, 2-pentene, 2-methyl-1-butene, 3-methyl-1-butene, and 2-methyl-2-butene; hexenes such as 1-hexene, 2-hexene, and 2-methyl-1-pentene; heptenes such as 1-heptene, 2-heptene, and 2-methyl-1-hexene; octenes such as 1-octene, 2-octene, 2-methyl-1-heptene, and di-isobutylene (2,4,4-trimethyl-1-pentene and 2,4,4-trimethyl-1-pentene).

The content of the $C_{4-8}$ acyclic monoolefin monomeric unit in the pre-modified resin is in a range of 5 mass % to 30 mass %, preferably in a range of 6 mass % to 28 mass %, and above all, preferably in a range of 7 mass % to 26 mass %, and in particular, preferably in a range of 8 mass % to 24 mass %. The content is in the above described range and thus the modified hydrocarbon resin of the present invention can provide a hot melt adhesive composition with low odor, excellent heat stability, and high adhesive properties.

Incidentally, there are no particular limitations on the ratio of each compound (including isomers) that corresponds to the $C_{4-8}$ acyclic monoolefin therein, and may be an arbitrary ratio; however, it is preferable that at least one kind selected from the group consisting of at least 2-methyl-2-butene, isobutylene, and di-isobutylene, is included, and it is more preferable that the ratio occupied by the total amount of 2-methyl-2-butene, isobutylene, and di-isobutylene in the $C_{4-8}$ acyclic monoolefin is 50 mass % or more.

The pre-modified resin may include an alicyclic diolefin as its raw material.

The alicyclic diolefin is a hydrocarbon compound having two ethyleny unsaturated bonds and a non-aromatic ring structure in its molecule structure. Specific examples of the alicyclic diolefin may include cyclopentadiene, a multimer of cyclopentadiene such as dicyclopentadiene, methylcyclopentadiene, and a multimer of methylcyclopentadiene.

The content of the alicyclic diolefin monomeric unit in the pre-modified resin is in a range of 0 mass % to 1 mass %, preferably in a range of 0 mass % to 0.8 mass %, and above all, preferably in a range of 0 mass % to 0.6 mass %, and in particular, preferably in a range of 0 mass % to 0.4 mass %. The content is in the above described range and thus the modified hydrocarbon resin of the present invention can provide a hot melt adhesive composition with low odor, excellent heat stability, and high adhesive properties.

The pre-modified resin may include an aromatic monoolefin as its raw material.

The aromatic monoolefin is an aromatic compound having one ethyleny unsaturated bond in its molecule structure. Specific examples of the aromatic monoolefin may include styrene, α-methylstyrene, vinyltoluene, indene, and coumarone.

The content of the aromatic monoolefin monomeric unit in the pre-modified resin is in a range of 0 mass % to 40 mass %, preferably in a range of 0 mass % to 38 mass %, and above all, preferably in a range of 0 mass % to 36 mass %, and in particular, preferably in a range of 0 mass % to 34 mass %. The content is in the above described range and thus the modified hydrocarbon resin of the present invention can provide a hot melt adhesive composition with low odor, excellent heat stability, and high adhesive properties.

The pre-modified resin may include an additional monomeric unit other than the 1,3-pentadiene monomeric unit, the $C_{4-6}$ alicyclic monoolefin monomeric unit, the $C_{4-8}$ acyclic monoolefin monomeric unit, the alicyclic diolefin monomeric unit, and the aromatic monoolefin monomeric unit, to the extent that allows the modified hydrocarbon resin capable of providing a hot melt adhesive composition with low odor, excellent heat stability, and high adhesive properties to be obtained.

There are no particular limitations on an additional monomer used to configure such an additional monomeric unit, as long as it is a compound having addition polymerizability that allows addition polymerization with a substance such as the 1,3-pentadiene, and is a compound other than the aforementioned monomeric unit. Examples of the additional monomer may include a $C_{4-6}$ unsaturated hydrocarbon other than 1,3-pentadiene such as 1,3-butadiene, 1,2-butadiene, isoprene, 1,3-hexadiene, and 1,4-pentadiene; $C_{7\ or\ more}$ alicyclic monoolefin such as cycloheptene; and acyclic monoolefin other than $C_{4-8}$ such as ethylene, propylene, and nonene.

However, the content of the additional monomeric unit in the pre-modified resin is to the extent that allows the modified hydrocarbon resin having the above described specific properties to be obtained; in specific, the content is usually in a range of 0 mass % to 30 mass %, preferably in a range of 0 mass % to 25 mass %, and more preferably in a range of 0 mass % to 20 mass %. Thus, the modified hydrocarbon resin of the present invention can provide a hot melt adhesive composition with low odor, excellent heat stability, and high adhesive properties.

There are no particular limitations on a method to produce the pre-modified resin as long as a polymerizable component (monomer mixture A) having a monomer capable of configuring the above described monomeric unit is suitably addition polymerized. For example, the pre-modified resin can be obtained by addition polymerization using Friedel-Crafts cation polymerization catalyst.

Examples of a method suitably used to produce the pre-modified resin may include a method comprising a polymerization step of polymerizing a monomer mixture A including a 1,3-pentadiene monomeric unit of 20 mass % to 70 mass %, a $C_{4-6}$ alicyclic monoolefin monomeric unit of 10 mass % to 35 mass %, a $C_{4-8}$ acyclic monoolefin monomeric unit of 5 mass % to 30 mass %, an alicyclic diolefin monomeric unit of 0 mass % to 1 mass %, and an aromatic monoolefin monomeric unit of 0 mass % to 40 mass %, by combining the following halogenated aluminum (A) with halogenated hydrocarbon (B) selected from the group consisting of halogenated hydrocarbon (B1) in which a tertiary carbon atom is connected to a halogen atom and halogenated hydrocarbon (B2) in which a carbon atom adjacent to a carbon-carbon unsaturated bond is connected to a halogen atom, to be a polymerization catalyst.

Specific examples of the halogenated aluminum (A) may include aluminum chloride ($AlCl_3$) and aluminum bromide ($AlBr_3$). Among them, from the viewpoints such as versatility, aluminum chloride is suitably used.

There are no particular limitations on the amount of use of halogenated aluminum (A); however, the amount of use to 100 parts by mass of the polymerizable component (monomer mixture A) is preferably in a range of 0.05 parts by mass to 10 parts by mass, and more preferably in a range of 0.1 parts by mass to 5 parts by mass.

The activation of the polymerization catalyst becomes extremely excellent when the halogenated hydrocarbon (B) and the halogenated aluminum (A) are used together.

Specific examples of the halogenated hydrocarbon (B1) in which a tertiary carbon atom is connected to a halogen atom may include t-butyl chloride, t-butyl bromide, 2-chloro-2-methylbutane, and triphenylmethyl chloride. Among these, t-butyl chloride is particularly suitably used for the point being excellent in balance of activity and easiness of handling.

Examples of the unsaturated bond in the halogenated hydrocarbon (B2) in which a carbon atom adjacent to a carbon-carbon unsaturated bond is connected to a halogen atom may include a carbon-carbon double bond and a carbon-carbon triple bond, which includes a carbon-carbon conjugated double bond such as in an aromatic ring. Specific examples of such a compound may include benzyl chloride, benzyl bromide, (1-chloroethyl)benzene, allyl chloride, 3-chloro-1-propyne, 3-chloro-1-butene, 3-chloro-1-butyne, and cinnamon chloride. Among these, benzyl chloride is particularly suitably used for the point being excellent in balance of activity and easiness of handling. Incidentally, the halogenated hydrocarbon (B) may be used in one kind, or two or more kinds thereof may be used in combination.

The amount of use of the halogenated hydrocarbon (B) is, at a molar ratio to the halogenated aluminum (A), preferably in a range of 0.05 to 50, and more preferably in a range of 0.1 to 10.

There are no particular limitations on the order of adding each component of the monomer mixture and polymerization catalyst to a polymerization reactor when performing a polymerization reaction, and they may be added in the arbitrary order; however, from the viewpoint of obtaining the modified hydrocarbon resin with more excellent color favorably controlling the polymerization reaction, it is preferable that the monomer mixture and a part of the component of the polymerization catalyst are added to the polymerization reactor to initiate the polymerization reaction and then the rest of the polymerization catalyst are added to the polymerization reactor.

In the production of the pre-modified resin, it is preferable that the halogenated aluminum (A) is mixed with the alicyclic monoolefin first. The contact treatment of the halogenated aluminum (A) and the alicyclic monoolefin allows a pre-modified resin with excellent color to be obtained while inhibiting the generation of gel.

The amount of the alicyclic monoolefin mixed with the halogenated aluminum (A) is preferably at least five times (mass ratio) of the amount of the halogenated aluminum (A).

If the amount of the alicyclic monoolefin is too little, there is a risk that prevention of gel generation and the effect of color improvement would be insufficient. The mass ratio of the alicyclic monoolefin and the halogenated aluminum (A) is preferably 5:1 to 120:1, more preferably 10:1 to 100:1, and further preferably 15:1 to 80:1. If the alicyclic monoolefin is excessively used much exceeding these ratio, there are risks that the catalyst activation would be degraded and the polymerization would not proceed sufficiently.

There are no particular limitations on the order of putting the halogenated aluminum (A) and the alicyclic monoolefin; the halogenated aluminum (A) may be put into the alicyclic monoolefin, and vice versa, the alicyclic monoolefin may be put into the halogenated aluminum (A). Since mixing thereof usually generates heat, an appropriate diluent may be also used. As the diluent, the solvent later described may be used.

It is preferable that, after a mixture M of the halogenated aluminum (A) and the alicyclic monoolefin is prepared as described above, at least the mixture "a" including the 1,3-pentadiene and the acyclic monoolefin is mixed with the mixture M. The mixture "a" may include alicyclic diolefin.

There are no particular limitations on the method for preparing the mixture "a"; the intended mixture "a" may be obtained by mixing each of pure compound, and the intended mixture "a" may be obtained by using a mixture including the intended monomer, such that derives from the fraction of a naphtha cracker. For example, in order to blend a substance such as the 1,3-pentadiene in the mixture "a", a C5 fraction after extracting isoprene and cyclopentadiene (including the multimers thereof) can be suitably used.

It is preferable that the halogenated hydrocarbon (B) is further mixed along with the mixture "a" and the mixture M. There are no particular limitations on the order of putting these three.

It is preferable that the polymerization reaction is conducted by adding a solvent to the polymerization reaction system from the viewpoint of controlling the polymerization reaction well. There are no particular limitations on the kind of the solvent as long as it does not inhibit the polymerization reaction; however, saturated aliphatic hydrocarbon or aromatic hydrocarbon is suitable. Examples of the saturated aliphatic hydrocarbon used as the solvent may include $C_{5-10}$ chain-shaped saturated aliphatic hydrocarbon such as n-pentane, n-hexane, 2-methylpentane, 3-methylpentane, n-heptane, 2-methylhexane, 3-methylhexane, 3-ethylpentane, 2,2-dimethylpentane, 2,3-dimethylpentane, 2,4-dimethylpentane, 3,3-dimethylpentane, 2,2,3-trimethylbutane, and 2,2,4-trimethylpentan; and a cyclic saturated aliphatic hydrocarbon in the range of $C_{5-10}$ such as cyclopentane, cyclohexane, cycloheptane, and cyclooctane. Examples of the aromatic hydrocarbon used as the solvent may include aromatic hydrocarbon in the range of $C_{6-10}$ such as benzene, toluene, and xylene. The solvent may be used one kind alone, and may be used as a mixture solvent of two kinds or more. There are no particular limitations on the amount of use of the solvent; however, to 100 parts by mass of the polymerizable component (the monomer mixture A), the amount of use is preferably in a range of 10 parts by mass to 1,000 parts by mass, and more preferably in a range of 50 parts by mass to 500 parts by mass. Incidentally, for example, a mixture of an addition polymerizable component and a non-addition polymerizable component such as a mixture of cyclopentane and cyclopentene derived from the C5 fraction may be added to the polymerization reaction system; the addition polymerizable component may be used as the component of the monomer mixture, and the non-addition polymerizable component may be used as the solvent.

There are no particular limitations on a polymerization temperature for performing the polymerization reaction; however, the temperature is preferably in a range of −20° C. to 100° C., and preferably in a range of 10° C. to 70° C. If the polymerization temperature is too low, there is possibility that the polymerization activity would be degraded to deteriorate the productivity, and if the polymerization temperature is too high, there is a risk that the color of the pre-modified resin to be obtained would be degraded. The pressure for performing the polymerization reaction may be under an atmospheric pressure, and may be under increased pressure. The time for the polymerization reaction may be appropriately selected; however, it is usually selected within a range of 10 minutes to 12 hours, and preferably selected within a range of 30 minutes to 6 hours.

The polymerization reaction can be terminated by adding a polymerization terminator such as methanol, a sodium hydroxide aqueous solution, and an ammonium solution to the polymerization reaction system at the point the intended polymerization conversion rate is obtained.

The method for producing the pre-modified resin comprises at least the polymerization step, but may comprise an additional step as required.

Examples of the additional step may include a catalyst residue removing step after the polymerization step, wherein a catalyst residue insoluble with the solvent generated when the polymerization catalyst is inactivated by the addition of the polymerization terminator in the polymerization reaction, is removed by filtrating thereof, and a collecting step after the termination of the polymerization reaction in the polymerization step, wherein unreacted monomer and solvent are removed, the oligomer component with low molecular amount is removed by a method such as steam distillation, and cooling thereof to obtain the pre-modified resin in a solid state.

Also, the additional step may include a contact treatment step after the catalyst residue removing step and before the collecting step, wherein a catalyst residue removed mixture after removing the catalyst residue insoluble with the solvent is made contact with an adsorbent to obtain an adsorbent treatment mixture. Inclusion of the contact treatment step allows the pre-modified resin and the modified hydrocarbon resin obtained by hydrogenating the pre-modified resin to have low odor.

Incidentally, the additional step may be conducted after the hydrogenation step in the later described method for producing the modified hydrocarbon resin.

There are no particular limitations on the adsorbent used in the contact treatment step; it may be a chemical adsorbent, and may be a physical adsorbent.

Examples of the chemical adsorbent may include a zinc-based adsorbent such as basic zinc carbonate, zinc oxide, zinc sulfate, zinc laurate, zinc stearate, and zinc myristate, a zirconium-based adsorbent such as zirconium oxide, zirconium hydroxide, and zirconium phosphate, a manganese-based adsorbent such as manganese dioxide, a cobalt-based adsorbent such as cobalt chloride, a copper-based adsorbent such as copper chloride and copper oxide, and an amine-based adsorbent such as a polyamine compound.

Examples of the physical adsorbent may include a zeolite-based adsorbent so called water-containing aluminosilicate minerals such as sodium aluminum silicate, silicon dioxide, magnesium oxide, silica gel, silica alumina, aluminum silicate, activated alumina, acid clay, activated clay, a dawsnites compound, and a hydrotalcites compound.

The adsorbent may be used singly in one kind, or two or more kinds thereof may be used in combination.

Also, when two or more kinds of the adsorbent are used in combination, two or more kinds of the chemical adsorbent may be used in combination, two or more kinds of the physical adsorbent may be used in combination, and one kind or more of the chemical compound and one kind or more of the physical adsorbent may be used in combination; for example, the physical adsorbent may carry the chemical adsorbent.

From the view point of obtaining the pre-modified resin and the modified hydrocarbon resin especially excellent in low odor, among these adsorbent, it is preferable to use the chemical adsorbent, more preferable to use the zinc-based adsorbent, and especially preferable to use the basic zinc carbonate.

There are no particular limitations on the method to make the adsorbent contact with the catalyst residue removed mixture in the contact treatment step. Examples of the method may include a batch processing method in which the catalyst residue removed mixture and the adsorbent are placed in an appropriately selected container together and stirred as required so as to contact each other, and a continuous processing method in which the adsorbent is filled in a packed tower in advance, and the catalyst residue removed mixture is distributed thereinto to bring them contact each other.

There are no particular limitations on the amount of use of the adsorbent when the catalyst residue removed mixture and the adsorbent are made contact by the batch processing method; however, to 100 parts by mass of the pre-modified resin included in the catalyst residue removed mixture, it is usually in a range of 0.01 parts by mass to 5.0 parts by mass, preferably in a range of 0.03 parts by mass to 3.0 parts by mass, and more preferably in a range of 0.05 parts by mas to 2.0 parts by mass.

There are no particular limitations on the temperature for making the catalyst residue removed mixture contact with the adsorbent; however, it is usually selected in a range of 10° C. to 70° C. Also, there are no particular limitations on the treatment time; however, it is usually selected in a range of 0.1 hour to 2 hours.

If the catalyst residue removed mixture and the adsorbent are made contact by the batch processing method, the adsorbent may be removed from the catalyst residue removed mixture by a method such as filtration as required. Also, in the case there would be no problem in using the pre-modified resin and the modified hydrocarbon resin if the adsorbent remained, it may be used in the next step without removing the adsorbent from the catalyst residue removed mixture.

2. Modified Hydrocarbon Resin

The modified hydrocarbon resin is a modified hydrocarbon resin obtained by hydrogenating the pre-modified resin which is a hydrocarbon resin.

The degree of hydrogenation of olefin (hereinafter it may be simply referred to as the degree of hydrogenation in some cases) in the modified hydrocarbon resin is in a range of 30% to 80%.

Here, the degree of hydrogenation of olefin refers to a hydrogenated proportion of the overall nonaromatic carbon-carbon double bonds in the pre-modified resin.

In the present invention, the degree of hydrogenation of the olefin is in a range of 30% to 80%, preferably in a range of 35% to 75%, and above all, preferably in a range of 40% to 70%. The said degree of hydrogenation is in the above described range and thus the modified hydrocarbon resin of the present invention has low odor, less color change due to factors such as heat, and excellent compatibility with the base polymer; as the result, a hot melt adhesive composition with low odor, excellent heat stability, and high adhesive properties can be provided.

If the modified hydrocarbon resin includes an aromatic monomeric unit, the degree of hydrogenation of the aromatic ring is in a range of 5% to 20%.

Here, the aromatic monomeric unit refers to arbitrary included aromatic monoolefin monomeric unit and the additional monomeric unit having an aromatic ring. The aromatic monomeric unit may be configured by just the aromatic monoolefin monomeric unit. Also, the degree of hydrogenation of aromatic ring refers to the proportion of hydrogenated aromatic ring in the overall aromatic rings of the pre-modified resin.

In the present invention, the degree of hydrogenation of the aromatic ring is in a range of 5% to 20%, preferably 6% or more, preferably 7% or more; on the other hand, preferably 18% or less, and more preferably 15% or less. The said degree of hydrogenation is in the above described range and thus the modified hydrocarbon resin of the present invention has low odor, less color change due to factors such as heat, and excellent compatibility with the base polymer; as the result, a hot melt adhesive composition with low odor, excellent heat stability, and high adhesive properties can be provided.

The degree of hydrogenation of the olefin or the aromatic ring can be measured from the difference between the amount of olefin or aromatic ring included in the pre-modified resin and that of the modified hydrocarbon resin. Here, the amount of olefin or aromatic ring included in each of the resin may be measured by a $^1$H-NMR spectrum measurement. The $^1$H-NMR spectrum measurement may be performed using deuterochloroform as a solvent and JMN-AL series AL400 from JEOL Ltd. as a NMR measurement device.

There are no particular limitations on the weight average molecular weight (Mw) of the modified hydrocarbon resin if it is in the range of 1,000 to 4,000; however, above all, it is preferably in a range of 1,500 to 3,800, and in particular, more preferably in a range of 1,800 to 3,600. The weight average molecular weight (Mw) in the above described range allows the modified hydrocarbon resin of the present invention to have excellent compatibility with the base polymer; as the result, a hot melt adhesive composition with high adhesive properties can be provided.

There are no particular limitations on the Z-average molecular weight (Mz) of the modified hydrocarbon resin if it is in a rage of 2,500 to 10,000; however, above all, it is preferably in a range of 3,200 to 9,000, and in particular, preferably in a range of 3,900 to 8,000. The Z-average molecular weight in the above described range allows the modified hydrocarbon resin of the present invention to have excellent compatibility with the base polymer; as the result, a hot melt adhesive composition with high adhesive properties can be provided.

Incidentally, in the present invention, the weight average molecular weight (Mw) and the Z-average molecular weight (Mz) of the modified hydrocarbon resin are measured by a measurement of high speed liquid chromatography as a value in terms of polystyrene.

The weight average molecular weight and the Z-average molecular weight can be measured by, more specifically, using "HLC-8320GPC" from Tosoh Corporation as a measurement device, with three connected columns of "TSK-gel™ SuperMultiporeHZ" from Tosoh Corporation as a column, and tetrahydrofuran as a solvent, at 40° C. and the flow amount of 1.0 mL/min.

There are no particular limitations on the ratio of the Z-average molecular weight to the weight-average molecular weight (Mz/Mw) as long as it is in a range of 1.5 to 2.5; however, above all, it is preferably in a range of 1.6 to 2.4, and in particular, more preferably in a range of 1.65 to 2.35. The ratio in the above described range allows the modified hydrocarbon resin of the present invention to have excellent compatibility with the base polymer; as the result, a hot melt adhesive composition with high adhesive properties can be provided.

There are no particular limitations on the Gardner color scale of a toluene solution of 50 mass % in the modified hydrocarbon resin as long as it is 2 or less; however, it is preferably 1 or less. The hydrocarbon resin with too large value of this would be inferior in its color.

The measurement method of the Gardner color scale in the present invention may be a method in which a toluene solution of 50 mass % for a modified hydrocarbon resin is prepared, and the Gardner scale of the solution is measured according to JIS K 0071-2.

The softening point of the modified hydrocarbon resin may be the point at which compatibility with the thermoplastic polymer compound is excellent; for example, it is 30° C. or more, preferably in a range of 50° C. to 125° C., and more preferably in a range of 60° C. to 115° C. The softening point in the above described range allows the modified hydrocarbon resin to have excellent compatibility with the thermoplastic polymer compound.

The softening point in the present invention may be, for example, a value measured for the modified hydrocarbon resin according to JIS K 6863.

There are no particular limitations on the difference between pre-hydrogenation and post-hydrogenation mixed aniline point (MMAP), that is, a difference obtained by subtracting the pre-hydrogenation mixed aniline point from the post-hydrogenation mixed aniline point, if it is 5° C. or less; above all, it is preferably 4° C. or less, and particularly preferably 3.5° C. or less. The difference between the mixed aniline points in the above described range allows the modified hydrocarbon resin of the present invention to have excellent compatibility with the base polymer; as the result, a hot melt adhesive composition with high adhesive properties can be provided.

Incidentally, the lower the minimum of the difference between the mixed aniline points is more preferable from the viewpoint of obtaining a hot melt adhesive composition with high adhesive properties; for example, it may be 0° C. or more. The reason therefor is to allow the modified hydrocarbon resin of the present invention to provide a hot melt adhesive composition with low odor, excellent heat stability, and high adhesive properties.

Here, the mixed aniline point refers to a lowest temperature in which the mixture solution of aniline, a sample and methylcyclohexane (2:1:1 in volume ratio) may be present as a uniform solution.

This mixed aniline point is closely related to the kind of the hydrocarbon compound; aromatics show the lowest value, followed by naphthenes and olefins, and paraffins show the highest value.

Then, in each homologous series, the larger the molecular weight becomes, the higher the mixed aniline point becomes.

Accordingly, in the present invention, the smaller the difference between the mixed aniline points is, the lower the degree of hydrogenation becomes, and the smaller the degree of modification of the pre-modified resin become by hydrogenation.

Incidentally, the measurement of the mixed aniline point may be performed in accordance with JIS K 2256 using methylcyclohexane instead of heptane.

The mixed aniline point of the modified hydrocarbon resin is, for example, when the modified hydrocarbon resin is used in a hot met adhesive composition, appropriately arranged depending on the kind of the base polymer and the like.

The mixed aniline point of the modified hydrocarbon resin is, for example, if the base polymer is a styrene-based block copolymer, preferably in a range of 40° C. to 120° C., and above all, preferably in a range of 45° C. to 110° C., and in particular, in a range of 50° C. to 100° C. The aniline point in the above described range allows the modified hydrocarbon resin of the present invention to have excellent compatibility with the base polymer; as the result, a hot melt adhesive composition with high adhesive properties can be provided.

As the method for producing the modified hydrocarbon resin, a method comprising a hydrogenation step to hydrogenate a pre-modified resin that is a hydrocarbon resin, may be used.

The hydrogenation of the pre-modified resin may be performed by making the pre-modified resin contact with hydrogen under presence of a hydrogenated catalyst.

The hydrogenated catalyst to be used may be those described in publications such as JP-A No. S58-43412, JP-A No. S60-26024, JP-A No. S64-24826, JP-A No. H1-138257, and JP-A No. H7-41550, and it may be a homogeneous catalyst and may be a heterogeneous catalyst.

Examples of the homogeneous catalyst may include a catalyst system comprising a combination of a transitional metal compound and an alkali metal compound such as the combination of cobalt acetate w/triethylaluminum, nickel acetylacetonate w/triisobutylaluminum, titanocenedichloride w/n-butyl lithium, zirconocenedichoride w/sec-butyl lithium, and tetrabutoxy titanate w/dimethyl magnesium; and a noble metal complex catalyst such as dichlorobis (triphenylphosphine)palladium, carbonyl(chlorohydrido)-tris(triphenylphosphine)-ruthenium, and chlorotris(triphenylphosphine)rhodium.

Examples of the heterogeneous catalyst may include one having a hydrogen added catalyst metal such as Ni and Pd carried by a carrier. Examples of the carrier may include silica, alumina, silica alumina, and diatom earth. Above all, a Ni catalyst carried by silica is preferable.

The hydrogenation reaction may be performed directly to the pre-modified resin, or may be performed in an organic solvent by dissolving the pre-modified resin in the organic solvent. From the viewpoint of easiness of handling, it is preferable to perform the reaction directly to the pre-modified resin. There are no special limitations on the organic solvent used to dissolve the pre-modified resin as long as it is inactive with the catalyst; however, a hydrocarbon-based solvent is usually used for its excellent solubility of a hydrogen-added product to be generated.

Examples of the hydrocarbon-based solvent may include aromatic hydrocarbons such as benzene and toluene; aliphatic hydrocarbons such as n-pentane and hexane; and alicyclic hydrocarbons such as cyclohexane and decaline; among these, ring-shaped aromatic hydrocarbons and alicyclic hydrocarbons are preferable. These organic solvent may be used in one kind alone, or two kinds or more thereof may be used in combination.

Incidentally, the solvent used in the polymerization of the pre-modified resin may be used as the organic solvent.

There are no particular limitations on the method for making the pre-modified resin contact with hydrogen under presence of the hydrogenated catalyst. Examples thereof may include a batch processing method in which the pre-modified resin and the hydrogenated catalyst are placed in an appropriately selected container together and stirred as required so as to contact each other, and a continuous processing method in which the hydrogenated catalyst is filled in a packed tower in advance, and the pre-modified resin is distributed thereinto to bring them contact each other.

The hydrogenation reaction may be performed according to a usual method. The degree of hydrogenation of the pre-modified resin can be adjusted by appropriately controlling the conditions of the reaction such as the kind of the hydrogenated catalyst and a reaction temperature.

If the homogeneous catalyst were used as the hydrogenated catalyst, the degree of hydrogenation of the pre-modified resin would be heightened, and a ruthenium homogeneous catalyst is preferable as the said homogeneous catalyst. The reaction temperature is preferably in a range of 100° C. to 200° C., and more preferably in a range of 130° C. to 195° C.

If the heterogeneous catalyst were used as the hydrogenated catalyst, the degree of hydrogenation of the pre-modified resin would be restrained, and a nickel heterogeneous catalyst is preferable as the said heterogeneous catalyst. The reaction temperature is preferably in a range of 150° C. to 300° C., and more preferably in a range of 180° C. to 260° C.

The hydrogen pressure is, in an absolute pressure, usually in a range of 0.01 MPa to 10 MPa, preferably in a range of 0.05 MPa to 6 MPa, and further preferably in a range of 0.1 MPa to 5 MPa.

After the termination of the hydrogenation reaction, the hydrogenated catalyst is removed from the reaction solution by a method such as centrifugation and filtration as required. There are no particular limitations on the method for centrifugation and filtration if conditions therefor allow the catalyst to be removed. Removing by filtration is preferably since it is easy and efficient. In the case of filtration, pressure filtration and vacuum filtration may be used. Also, from the point of efficiency, it is preferable to use a filter aid such as diatom earth and pearlite. Also, as required, a catalyst deactivator such as water and alcohol may be used, and an adsorbent such activated clay and alumina may be added.

Incidentally, configurations regarding the modified hydrocarbon resin such as the degree of hydrogenation of the olefin, the degree of hydrogenation of the aromatic ring, the weight average molecular weight (Mw), the Z-average molecular weight (Mz), the ratio of the Z-average molecular weight to the weight average molecular weight (Mz/Mw), the Gardner color scale, and the difference between pre-hydrogenation and post-hydrogenation mixed aniline point (MMAP) can be easily adjusted to the desired range by preparing the modified hydrocarbon resin in accordance with the aforementioned blending and production method.

The modified hydrocarbon resin of the present invention obtained in the manner described above has low odor and excellent heat stability; thus, it can be applied to various usages to which conventional modified hydrocarbon resins are applicable. Above all, the modified hydrocarbon resin has excellent compatibility with the base polymer so as to be suitably used as a tackifying resin for an adhesive, and especially suitably used as a tackifying resin for a hot melt adhesive composition, taking the advantage of characteristic.

B. Hot Melt Adhesive Composition

Next, the hot melt adhesive composition of the present invention is explained.

The hot melt adhesive composition of the present application is characterized by comprising the above described modified hydrocarbon resin and a thermoplastic polymer compound.

According to the present invention, usage of the above described modified hydrocarbon resin allows low odor, excellent heat stability, and high adhesive properties.

The hot melt adhesive composition of the present invention comprises the modified hydrocarbon resin and a thermoplastic polymer compound.

Each composition in the hot melt adhesive composition of the present invention is hereinafter explained in details.

1. Modified Hydrocarbon Resin

The content of the modified hydrocarbon resin may be a content that allows a hot melt adhesive with low odor, excellent heat stability, and high adhesive properties to be obtained.

The content may be, for example, as a ratio to 100 parts by mass of the thermoplastic polymer compound, in a range of 50 parts by mass to 500 parts by mass, and above all, preferably in a range of 80 parts by mass to 400 parts by mass, and in particular, preferably in a range of 100 parts by mass to 300 parts by mass. The content in the above described range allows the hot melt adhesive composition to have low odor, excellent heat stability, and high adhesive properties.

Incidentally, the modified hydrocarbon resin may be in the same contents as those described in the section "A. Modified hydrocarbon resin" above; thus, the explanation herein is omitted.

2. Thermoplastic Polymer Compound

As the thermoplastic polymer compound, a generally known thermoplastic polymer compound used in a hot melt adhesive composition as a base polymer can be used.

As such a thermoplastic polymer compound, specifically usable is rubber such as natural rubber, polyisoprene, polybutadiene, and polyisobutylene; a thermoplastic resin such as low density polyethylene, an ethylene-vinyl acetate copolymer, an ethylene-ethyl acrylate copolymer, polyamide, and polyester; and a thermoplastic elastomer such as an aromatic vinyl-conjugated diene block copolymer and hydrogenated product thereof.

In the present invention, above all, the thermoplastic polymer compound is preferably the aromatic vinyl-conjugated diene block copolymer and hydrogenated product thereof, and particularly preferably aromatic vinyl-conjugated diene block copolymer and hydrogenated product thereof in which the aromatic vinyl is styrene, and above all, particularly preferably a styrene-based block copolymer. When the thermoplastic polymer compound is the copolymer described above, the thermoplastic polymer compound is excellently compatible with the modified hydrocarbon resin, and thus it is easy to provide a hot melt adhesive composition with high adhesive properties.

The styrene-based block copolymer may be the one that includes styrene as aromatic vinyl. Examples thereof may include a styrene-butadiene-styrene block copolymer and a styrene-isoprene-styrene block copolymer; those of which weight average molecular weight is in a range of 50,000 to 350,000 and the styrene unit content is in a range of 5 mass % to 50 mass % can be preferably used.

In the case of the styrene-butadiene-styrene block copolymer, the one of which styrene unit content is in a range of 25 mass % to 50 mass % is preferable. In the case of the styrene-isoprene-styrene block copolymer, the one of which styrene unit content is in a range of 10 mass % to 30 mass % can be preferably used.

Incidentally, the thermoplastic polymer compound may be the one including at least one kind, may be the one including just one kind, and may be used by mixing two or more kinds.

3. Other Components

The hot melt adhesive composition may comprise just the modified hydrocarbon resin and the thermoplastic polymer compound, but may further comprise other components.

Examples of the additional component may include an antioxidant, perfume, and an adsorbent. Inclusion of these components allows the hot melt adhesive composition of the present invention to be low odor.

(1) Antioxidant

The antioxidant may be the one capable of reducing the odor derived from the modified hydrocarbon resin by blending, and generally known antioxidant used in hot melt adhesive compositions can be used; however, in the present invention, above all, the antioxidant is preferably a compound including a 2,2,6,6-tetraalkyl-4-piperidyl group. Inclusion of the above described compound as the antioxidant allows the hot melt adhesive composition to be low odor.

Here, the "2,2,6,6-tetraalkyl-4-piperidyl group" refers to a group represented by the following formula (1).

[Chemical Formula 1]

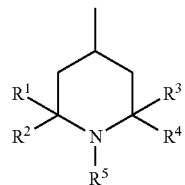

(1)

In the formula (1), $R^1$ to $R^4$ are arbitrary alkyl groups, and preferably $C_{1-4}$ alkyl groups. $R^5$ is hydrogen or a $C_{1-8}$ alkyl group or alkoxy group that may have a substituent. $R^1$ to $R^4$ may be the same and may be different from each other. Specific examples thereof may include a methyl group, an ethyl group, a propyl group, a butyl group, a hexyl group, and an octyl group; however, the methyl group, the ethyl group, the propyl group, and the butyl group are preferable. Specific examples of $R^5$ may include hydrogen and a methyl group, and an octyl group, but hydrogen is preferable. As the compound including the 2,2,6,6-tetraalkyl-4-piperidyl group represented by the formula, those having the molecular weight of approximately 400 to 4,000 has been known, and a part of them has been commercially available.

Specific examples of the said piperidyl group-containing compound may include the following compounds (product names are in parentheses [ ]; all of them are from Ciba Specialty Chemicals):

(i) bis(2,2,6,6-tetramethyl-4-piperidyl)sebacate [TINUVIN770]
(ii) poly[{6-(1,1,3,3-tetramethylbutyl)amino-1,3,5-triazin-2,4-diyl}{(2,2,6,6-tetramethyl-4-piperidyl) imino}hexamethylene{(2,2,6,6-tetramethyl-4-piperidyl) imino}] [CHIMASSORB 944]
(iii) bis(1,2,2,6,6-pentamethyl-4-piperidyl)sebacate [TINUVIN 765]
(iv) 2-(3,5-di-t-butyl-4-hydroxybenzyl)-2-n-butylmalonatebis(1,2,2,6,6-pentamethyl-4-piperidyl) [TINUVIN 144]
(v) Dimethylsuccinate-1-(2-hydroxyethyl)-4-hydroxy-2,2,6,6-tetramethyl-4-piperidine polycondensate [TINUVIN 622]
(vi) N,N'-bis(3-aminopropyl)ethylenediamine-2,4-bis[N-butyl-N-(1,2,2,6,6-pentamethyl-4-piperidyl)amino]-6-chloro-1,3,5-triadine condensate [CHIMASSORB 119]
(vii) bis(1-octyloxy-2,2,6,6-tetramethyl-4-piperidyl)sebacate [TINUVIN 123].

In the above, (i) and (ii) are preferable since the effect of color stabilization when heated is remarkable.

The content of the antioxidant may be a content that allows the hot melt adhesive composition with low odor, excellent heat stability, and high adhesive properties to be obtained.

The content may be, for example, as the ratio to 100 parts by mass of the thermoplastic polymer compound, in a range of 0.05 parts by mass to 5 parts by mass, and above all, preferably in a range of 0.08 parts by mass to 1 part by mass, and particularly preferably in a range of 0.1 parts by mass to 0.5 parts by mass. The content in the above described range allows the hot melt adhesive with low odor, excellent heat stability, and high adhesive properties to be obtained.

(2) Perfume

The perfume may be the one capable of reducing the odor derived from the modified hydrocarbon resin by blending.

As such perfume, various perfume used in a hot melt adhesive composition can be used; however, in the present invention, above all, it is preferable that the perfume is a single perfume of which boiling point under normal pressure is 200° C. or more or a compound perfume comprising two or more kinds of the single perfume. Inclusion of the above described perfume as the perfume allows masking of the odor derived from the modified hydrocarbon resin, and thus the hot melt adhesive composition becomes low odor.

The boiling point of the single perfume of which boiling point under normal pressure is 200° C. or more may be 200° C. or more under normal pressure, and preferably 220° C. or more.

The above described boiling point allows the single perfume to have less evaporation emission and decomposition degradation at a normal temperature or a processing temperature. Accordingly, the hot melt adhesive composition of the present invention can be persistently low odor even when it is kept for a long period of time.

In the present invention, appropriate single perfume for masking the odor of the modified carbon resin is the one having either one of green-like, vanilla-like, balsam-like, woody-like, musk-like, amber-like, fruit-like, and floral-like single perfume. Among them, the one having green-like, vanilla-like, balsam-like, woody-like, musk-like, amber-like, and fruit-like single perfume is particularly preferable. The compound perfume comprising two or more kinds of the single perfume may be the one having a compound perfume including two or more kind of these single perfumes.

Specific examples of the single perfume preferably usable in the present invention may include, as the green-like perfume, cis-3-hexenylsalicylate, Triplal, Helional, and "alcohol having $C_{9-11}$ main chain including one unsaturated bond" such as 4-methyl-3-decenol, 9-decenol, 1-undecenol, and cis-6-nonenal; as the vanilla-like perfume, vanillin, ethyl vanillin, and heliotropin; as the balsam-like perfume, benzyl cinnamate, and isoeugenol; as the woody-like perfume, α-ionone, β-ionone, methyl ionone, acetyl cedrene, and santalol; as the musk-like perfume, galaxolide, and ethylene brassylate; as the amber-like perfume, Iso E Super, and ambroxan; as the fruit-like perfume, methyl-p-tolylethylglycidate, methyl anthranilate, ortho-tert-butylcyclohexyl acetate, and a "$C_{9-11}$ lactone compound having 5 to 6 membered ring structure" such as γ-nonalactone, γ-decalactone, δ-decalactone, and γ-undecalactone; as the floral-like perfume, geraniol, citronellol, phenyl ethyl alcohol, methyldihydrojasmonate, and benzyl benzoate; and as the other perfume difficult to be categorized in the above and those including a compound perfume, eugenol, indole, phenylethylphenyl acetate, benzyl acetate, citronellyl nitryl, lily aldehyde, lyral, α-damascone, and β-damascone.

In the present invention, among them, it is preferable that the single perfume is the "alcohol having $C_{9-11}$ main chain including one unsaturated bond" such as 4-methyl-3-decenol, 9-decenol, 1-undecenol, and cis-6-nonenal, and the "$C_{9-11}$ lactone compound having 5 to 6 membered ring structure" such as γ-nonalactone, γ-decalactone, δ-decalactone, and γ-undecalactone.

The content of the perfume may be a content that allows the hot melt adhesive composition with low odor, excellent heat stability, and high adhesive properties to be obtained.

The content may be, for example, as a mass ratio to the thermoplastic polymer compound, in a range of 5 ppm to 1000 ppm, and above all, preferably in a range of 10 ppm to 500 ppm, and particularly preferably in a range of 20 ppm to 200 ppm. The content in the above described range allows the hot melt adhesive composition with low odor to be obtained.

(3) Adsorbent

The adsorbent may be the one capable of reducing the odor derived from the modified hydrocarbon resin by blending.

Such an adsorbent may be the same as those described in the section "A. Modified hydrocarbon resin" above.

The content of the adsorbent may be a content that allows the hot melt adhesive composition with low odor, excellent heat stability, and high adhesive properties to be obtained.

The content may be, for example, as a ratio to 100 parts by mass of the thermoplastic polymer compound, in a range of 0.05 parts by mass to 5 parts by mass, and above all, preferably in a range of 0.08 parts by mass to 1 part by mass, and particularly preferably in a range of 0.1 parts by mass to 0.5 parts by mass, so as to obtain the hot melt adhesive with low odor, excellent heat stability, and high adhesive properties.

As the method for adding the adsorbent to the hot meld adhesive composition, a method to add the adsorbent to the thermoplastic polymer compound and the modified hydrocarbon resin and mix thereof can be used.

Also, the method for adding may be, when the production method of the pre-modified resin used in the production of the modified hydrocarbon resin comprises the contact treatment step, a method to use the adsorbent used and made contact in the production of the pre-modified resin without removing the adsorbent, but to use the adsorbent as a component of the hot melt adhesive composition.

(4) Others

As the additional component, other compounding agents such as a wax, an oxidation inhibitor, a softening agent, a tackifying resin other than the modified hydrocarbon resin of the present invention, a heat stabilizer, an ultraviolet ray absorbent, and a filler, can be added.

Incidentally, the hot melt adhesive composition of the present invention is preferably a solvent-free composition that does not include a solvent.

There are no particular limitations on the wax that can be blended with the hot melt adhesive composition of the present invention; for example, a polyethylene wax, an ethylene vinyl acetate copolymer wax, a polyethylene oxide wax, a paraffin wax, a microcrystalline wax, a Fischer-Tropsh wax, a Fischer-Tropsh oxide wax, a hydrogenated castor oil wax, a polypropylene wax, a byproduct polyethylene wax, and a stearamido hydroxide wax can be used. The wax may be used singly in one kind, or two kinds or more thereof may be used in combination. There are no particular limitations on the content of the wax in the hot melt adhesive composition; however, per 100 parts by mass of the thermoplastic polymer compound, the content is preferably in a range of 10 parts by mass to 200 parts b mass, and more preferably in a range of 20 parts by mass to 100 parts by mass. The content of the wax is in this range, and thus the hot melt adhesive composition to be obtained becomes particularly excellent in coating easiness.

There are no particular limitations on the oxidation inhibitor that can be blended in the hot melt adhesive composition of the present invention; for example, a hindered phenol-based compound such as pentaerythritoltetrakis[3-(3,5-di-t-butyl-4-hydroxyphenyl)propionate], octadecil-3-(3,5-di-t-butyl-4-hydroxyphenyl)propionate, 2,6,-di-t-butyl-p-cresol, and di-t-butyl-4-methylphenol; thiodicarboxylate esters such as dilaurylthiopropinate; and phosphites such as tris (nonylphenyl)phosphite, can be used. There are no particular limitations on the use of amount of the oxidation inhibitor; however, per 100 parts by mass of the thermoplastic polymer compound, it is usually 10 parts by mass or less, and preferably in a range of 0.5 parts by mass to 5 parts by mass. Incidentally, the oxidation inhibitor may be used singly in one kind, or two or more kinds thereof may be used in combination.

There are no particular limitations on the softening agent that can be blended in the hot melt adhesive of the present invention; for example, an aromatic, paraffin-based, or naphthene-based processed oil; and a liquid polymer such as polybutene and polyisobutylene, can be used. The softening agent may be used singly in one kind, or two kinds or more thereof may be used in combination.

As the tackifying resin other than the modified hydrocarbon resin that can be blended in the hot melt adhesive composition of the present invention, conventionally known tackifying resins can be used. Specific examples thereof may include rosin; modified rosins such as disproportionated rosin and duplex rosin; an ester compound of polyalcohol such as glycol, glycerin, and pentaerythritol with rosin or modified rosins; a terpene-based resin; an aliphatic, aromatic, alicyclic or aliphatic-aromatic copolymer-based hydrocarbon resin or hydrogenated products thereof; a phenol resin; and a coumarone-indene resin. These tackifying resins may be used singly in one kind, or two kinds or more thereof may be used in combination.

There are no particular limitations on the method for mixing the modified hydrocarbon resin, the thermoplastic polymer compound and further other components added as required to obtain the hot melt adhesive composition of the present invention; examples thereof may include a method in which each component is dissolved in a solvent and uniformly mixed and thereafter the solvent is removed by a method such as heating, and a method in which each component is melted and mixed by a device such as a kneader. From the viewpoint of conducting the mixing more efficiently, the method of melting and mixing is suitable among them. Incidentally, there are no particular limitations on the temperature for conducting the melting and mixing; however, it is usually in a range of 100° C. to 200° C.

The hot melt adhesive composition of the present invention contains the modified hydrocarbon resin as the tackifying resin so as to be with low odor, excellent heat stability, and high adhesive properties.

Thus, the hot melt adhesive composition of the present invention can be applied to adhere various members, and also, the adhesion thereof can be conducted by saving energy with high productivity and high sustainability.

The hot melt adhesive composition of the present invention can be applied to various usages, and there are no particular limitations on the usage thereof; however, since it can exhibit sufficient adhesion strength with a little coating amount and also, it has a characteristic of excellent heat deterioration resistance and thus is not easily deteriorated in a device such as a sealer, it can be particularly suitably used as an adhesive for sealing industrial packing material for use in transportation.

The present invention is not limited to the embodiments. The embodiments are exemplifications, and any other variations are intended to be included in the technical scope of the present invention if they have substantially the same constitution as the technical idea described in the claim of the present invention and offer similar operation and effect thereto.

EXAMPLES

Hereinafter, the present invention will be more specifically described by way of Examples and Comparative Examples. Incidentally, unless particularly stated otherwise, parts and percentage (%) in the various Examples are on a mass basis.

Various measurements were carried out by the following methods.

[Weight Average Molecular Weight, Z-Average Molecular Weight and Molecular Weight Distribution]

The modified hydrocarbon resin as a sample was analyzed by gel permeation chromatography to determine the weight average molecular weight (Mw) and the Z-average molecular weight (Mz) calculated relative to polystyrene standards, and the molecular weight distribution was shown as the ratio of Mz/Mw. Incidentally, the measurement by the gel permeation chromatography analysis was conducted using "HLC-8320GPC™" from Tosoh Corp. as a measurement device, with three connected columns of "TSKgel SuperMultiporeHZ" from Tosoh Corp. as the column, and tetrahydrofuran as a carrier at 40° C. and a flow amount of 1.0 mL/min.

[Gardner Color Scale of Toluene Solution of 50 Mass %]

A toluene solution of 50 mass % for the modified hydrocarbon resin as a sample was prepared and the Gardner color scale of the said solution was measured according to JIS K 0071-2. The smaller value indicates more excellent color.

[Softening Point (° C.)]

Measurement for the modified hydrocarbon resin as a sample was conducted according to JIS K 6863.

[Mixed Aniline Point (° C.)]

Measurement for the pre-modified resin and the modified hydrocarbon resin as a sample was conducted based on JIS K 2256 replacing heptane with methylcyclohexane.

[Degree of Hydrogenation of Olefin (%) and Degree of Hydrogenation of Aromatic Ring (%)]

The amount of olefin and the amount of aromatic ring in the pre-modified resin and the modified hydrocarbon resin as a sample were respectively measured by a $^1$H-NMR spectrum measurement, and the degree of hydrogenation of olefin (%) and the degree of hydrogenation of aromatic ring (%) were calculated based on the difference between pre-hydrogenation and post hydrogenation olefin amount and aromatic ring amount.

Incidentally, in the $^1$H-NMR spectrum measurement, deuterochloroform was used as a solvent, and JMN-AL series AL400 from JEOL Ltd. was used as a NMR measurement device.

[Loop Tackiness (N)]

The loop tackiness of the hot melt adhesive composition as a sample in an atmosphere of 23° C. was measured based on FINAT-1991 FTM-9 (Quick-stick tack measurement), and the tackiness was evaluated. The higher value indicates better condition.

[Peeling Adhesion Strength (N/25 mm)]

The measurement was conducted for the hot melt adhesive composition as a sample based on PSTC-1 (180° peeling adhesion test by US Pressure Sensitive Adhesive Tape Council) using a stainless substrate as an adherend at 23° C. The higher value indicates better condition.

[Odor Evaluation Test]

The sensory evaluation of the hot melt adhesive composition as a sample was conducted according to the odor intensity measurement method in Odor Measurement Method by Olfaction issued by Japan Association of Odor Environment.

In specific, first, the hot melt adhesive composition of 10 g and the size of a piece being approximately 10 mm×5 mm×5 mm was put in a heat resistant container of 120 mL and the container was covered by an aluminum foil. Then, the heat resistant container with the hot meld adhesive composition therein was put in an oven and heated in the conditions of a temperature of 150° C. and for 30 minutes, and the odor after the heating was confirmed.

The odor was confirmed by the panel of 6 people not used to the odor of petroleum resin (which means they do not have contact with the odor of petroleum resin in usual lifestyle). In this test, to prevent olfactory fatigue, the method adopted was to divide the panel of 6 people into 2 groups of 3 people in each group, and the odor was smelt by one group by the other. Also, the order of the samples for smelling the odor was at random.

0: No odor
1: Barely recognizable odor
(Detection Threshold Concentration)
2: Weak odor but can be known what odor is
(Recognition Threshold Concentration)
3: Easily sensible odor
4: Strong odor
5: Intensive odor Incidentally, the result of the sensory test was determined by excluding the maximum value and the minimum value among the judged values respectively from the panel of 6 people, and by averaging the judged values of the rest of 4 people. The smaller value of the sensory test is more preferable.

Also, the sensory test for the modified hydrocarbon resin as a sample was conducted in the same method as the above described sensory test for the hot melt adhesive composition as a sample.

[Color]

Regarding the hot melt adhesive composition as a sample, the color of the hot melt adhesive composition was visually observed. The color with higher transparency can be judged to have less degree of heat deterioration in preparation of the hot melt adhesive composition and excellent heat stability.

Example 1

The mixture of cyclopentane of 57.9 parts and cyclopentene of 25.4 parts was introduced to a polymerization reactor, the temperature was raised to 60° C., and thereafter aluminum chloride of 0.6 parts was added thereto (mixture $M_1$). Sequentially, the mixture $a_1$ comprising 1,3-pentadiene of 42.7 pats, isobutylene of 8.7 parts, styrene of 22.7 parts, C4-C6 unsaturated hydrocarbon of 0.5 parts, and C4-C6 saturated hydrocarbon of 7.4 parts; and t-butyl chloride of 0.2 parts were, respectively through separate lines, maintained at a temperature of 60° C. for 60 minutes, and continuously added to the polymerization reactor including the mixture $M_1$ to perform polymerization. After that, a sodium hydroxide solution was added to the polymerization reactor to terminate the polymerization reaction. Incidentally, the kind and the amount of the components in the polymerization reactor at the time of polymerization reaction are shown in Table 1 altogether. Sediments generated by the polymerization termination were removed by filtration to obtain a polymer solution including components such as a pre-modified resin and unreacted monomeric units.

Also, the polymer solution was partially taken out and introduced to a distillation still, heated under a nitrogen atmosphere to remove the polymerization solvent and the unreacted monomeric unit, and thereby a pre-modified resin was obtained.

Also, a polymer solution as a raw material was supplied to a tuber heat exchanging hydrogenation reaction device, the pre-modified resin was hydrogenated thereby to produce a modified hydrocarbon resin. The hydrogenation reaction was conducted using a nickel silica catalyst (from JGC Catalyst and Chemicals Ltd.; N108F) as a hydrogenated catalyst, and in the conditions of the hydrogen pressure of 2 MPa, the reaction temperature of 200° C., and the time for retention in the reaction tube of 30 minutes.

The polymer solution including the modified hydrocarbon resin, the hydrogenated pre-modified resin, was introduced to a distillation still, heated under a nitrogen atmosphere to remove the polymerization solvent and unreacted monomeric units. Next, oligomer components with low molecular weight were distilled while blowing saturated water vapor at 200° C. or more.

After that, a melted resin was taken out from the distillation still, cooled to a room temperature, and thereby a modified-hydrocarbon resin for Example 1 was obtained.

The weight average molecular weight, Z-average molecular weight, molecular weight distribution, Gardner color scale, softening point, mixed aniline point (post-modified mixed aniline point), degree of hydrogenation of olefin, and degree of hydrogenation of aromatic ring, of the obtained modified hydrocarbon resin for Example 1 were determined, and the odor evaluation test was conducted therefor. The measurement results of these are shown in Table 1 below altogether.

Also, the mixed aniline point of the pre-modified resin used to produce the modified hydrocarbon resin for Example 1 (pre-modified mixed aniline point) was measured, and the result is shown in Table 1 below.

Examples 2 to 4, Comparative Examples 1 to 4

The modified hydrocarbon resins for Examples 2 to 4 and Comparative Examples 1 to 4 were respectively obtained in the same manner as in Example 1 except that the kind and the amount of components added to the polymerization reactor, the polymerization temperature and the conditions for hydrogenation were respectively changed as shown in Table 1 below. Incidentally, diisobutylene, dicyclopentadiene, toluene, and benzyl chloride not described in Example 1 were used for the polymerization by mixing with t-butyl chloride together with a component such as 1,3-pentadiene.

The same measurements as in Example 1 were conducted for the obtained modified hydrocarbon resins for Examples 2 to 4 and Comparative Examples 1 to 4. The results of these measurements are shown in Table 1 below altogether.

[Production and Evaluation of Hot Melt Adhesive Composition]

As the thermoplastic polymer compound, a styrene-butadiene-styrene copolymer (SBS, from Asahi Kasei Corporation; Asaprene (registered trademark) T-439) of 100 pats by mass, the modified hydrocarbon resin for Example 1 of 120 parts, a wax (from Japan Sun Oil Co., Ltd.; SUNPURE N-90) of 10 parts, and an oxidation inhibitor (from BASF; IRGANOX1010 (product name)) of 1.0 parts were kneaded for 1 hour at 180° C. to obtain a hot melt adhesive composition including the modified hydrocarbon resin for Example 1.

The loop tackiness and peeling adhesion strength of the hot melt adhesive composition including the modified hydrocarbon resin for Example 1 were measured, and also the odor evaluation test and visual color evaluation were conducted using thereof. The results of these measurement and tests are shown in Table 1 altogether.

Hot melt adhesives of the modified hydrocarbon resins obtained for Examples 2 to 4 and Comparative Examples 2 to 4 were respectively produced in the same manner as in Example 1, the loop tackiness and peeling adhesion strength thereof were measured, and also the odor evaluation test and visual color evaluation were conducted using thereof.

Incidentally, as shown in Table 1 below, in Examples 2 to 4 and Comparative Examples 2 to 3, a styrene-isoprene-styrene block copolymer (SIS, from ZEON Corporation Quintac (registered trademark) 3620) was used as the thermoplastic polymer compound instead of SBS.

TABLE 1

| | | | Examples | | | | Comparative Examples | | | |
|---|---|---|---|---|---|---|---|---|---|---|
| | | | 1 | 2 | 3 | 4 | 1 | 2 | 3 | 4 |
| Pre-modified resin | | 1,3-pentadiene | 42.7 | 53.9 | 48.6 | 43.2 | 41.5 | 49.8 | 55.5 | 38.0 |
| | C4-C6 alicyclic monoolefin | Cyclopentene | 25.4 | 30.7 | 26.9 | 29.1 | 25.4 | 26.9 | 23.5 | 24.9 |
| | C4-C6 acyclic monoolefin | Isobutylene | 8.7 | 12.6 | 18.3 | 18.5 | 9.6 | 18.0 | 5.8 | 9.4 |
| | | Diisobutylene | 0.0 | 1.6 | 5.3 | 2.0 | 0.0 | 4.9 | 0.0 | 0.0 |

TABLE 1-continued

|  |  | Examples | | | | Comparative Examples | | | |
| --- | --- | --- | --- | --- | --- | --- | --- | --- | --- |
|  |  | 1 | 2 | 3 | 4 | 1 | 2 | 3 | 4 |
| Alicyclic diolefin | Dicyclopentadiene | 0.0 | 0.2 | 0.0 | 0.1 | 0.0 | 0.0 | 0.0 | 0.3 |
| Additional monomeric unit | C4-C6 unsaturated hydrocarbon | 0.5 | 1.0 | 0.9 | 0.6 | 0.8 | 0.4 | 0.7 | 0.5 |
| Aromatic monoolefin | Styrene | 22.7 | 0.0 | 0.0 | 6.5 | 22.7 | 0.0 | 14.5 | 26.9 |
| Parts of monomer mixture overall |  | 100.0 | 100.0 | 100.0 | 100.0 | 100.0 | 100.0 | 100.0 | 100.0 |
| Solvent composition (parts) | C4-C6 unsaturated hydrocarbon | 7.4 | 8.7 | 7.4 | 9.3 | 9.1 | 7.4 | 3.8 | 6.8 |
|  | Cyclopentane | 57.9 | 53.7 | 45.6 | 71.9 | 55.2 | 45.6 | 40.2 | 62.4 |
|  | Toluene | — | 2.0 | — | — | — | — | 3.4 | — |
| Polymerization composition (parts) | Aluminum chloride | 0.6 | 0.7 | 1 | 0.9 | 0.9 | 1 | 0.6 | 1.5 |
|  | t-butyl chloride | 0.2 | — | 1 | 0.5 | — | 1 | — | — |
|  | Benzyl chloride | — | 0.5 | — | — | — | — | 0.3 | — |
| Polymerization temperature (° C.) |  | 60 | 50 | 55 | 60 | 65 | 55 | 60 | 80 |
| Hydrogenation conditions | Temperature (° C.) | 200 | 255 | 250 | 240 | 240 | 195 | 230 | 290 |
|  | Pressure (MPa) | 2 | 1.7 | 2.2 | 2.4 | 2.5 | 1.5 | 2.1 | 1.1 |
| Properties of modified hydrocarbon resin | Softening point (° C.) | 95 | 108 | 93 | 96 | 93 | 95 | 106 | 93 |
|  | Weight average molecular weight (Mw) | 2400 | 3500 | 1900 | 2000 | 2320 | 2100 | 4500 | 2550 |
|  | Z-average molecular weight (Mz) | 5400 | 7100 | 3150 | 4300 | 5300 | 3550 | 11000 | 5500 |
|  | Molecular weight distribution (Mz/Mw) | 2.25 | 2.03 | 1.66 | 2.15 | 2.28 | 1.69 | 2.44 | 2.16 |
|  | Post-modified Gardner color scale | 0.4 | 0.6 | 0.7 | 0.7 | 0.4 | 1.8 | 0.7 | 2.5 |
|  | Difference between pre-modified and post-modified mixed aniline point (° C.) | 2.8 | 0.2 | 0.3 | 1.1 | 6.9 | 0.1 | 2.2 | 2.0 |
|  | Pre-modified mixed aniline point (° C.) | 63.2 | 97.9 | 94.5 | 82.6 | 63.2 | 94.5 | 74.8 | 56.1 |
|  | Post-modified mixed aniline point (° C.) | 66.0 | 98.1 | 94.8 | 83.7 | 70.1 | 94.6 | 77.0 | 58.1 |
|  | Degree of hydrogenation of olefin (%) | 46.6 | 37.2 | 49.7 | 51.8 | 89.3 | 12.1 | 46.1 | 34.0 |
|  | Degree of hydrogenation of aromatic ring (%) | 8.2 | — | — | 10.7 | 26.7 | — | 10.1 | 7.6 |
|  | Odor intensity (6 scales) | 1.5 | 1.5 | 1 | 1 | 1 | 2.5 | 2 | 2.5 |
| Composition of hot melt adhesive composition (parts) | SBS (Asaprene T-439) | 100 | — | — | — | 100 | — | — | 100 |
|  | SIS (Quintac 3620) | — | 100 | 100 | 100 | — | 100 | 100 | — |
|  | Modified hydrocarbon resin | 120 | 120 | 120 | 120 | 120 | 120 | 120 | 120 |
|  | Plasticizer (Sunpure N90) | 10 | 10 | 10 | 10 | 10 | 10 | 10 | 10 |
|  | Oxidation inhibitor (IRGANOX 1010) | 1 | 1 | 1 | 1 | 1 | 1 | 1 | 1 |
| Properties of hot melt adhesive composition | Loop tackiness (N) | 15 | 13 | 17 | 19 | 15 | 15 | 10 | 13 |
|  | Peeling adhesion strength (N/25 mm) | 700 | 810 | 650 | 650 | 380 | 660 | 400 | 800 |
|  | Color (visual) | Light yellow | Light yellow | Light yellow | Light yellow | Light yellow | Light yellow | Light yellow | Yellow |
|  | Odor intensity (6 scales) | 1.5 | 1.5 | 1.5 | 1.5 | 1.5 | 2.5 | 2 | 2.5 |

From Table 1, it was confirmed that the modified hydrocarbon resins obtained in Examples 1 to 4 satisfied all of the degree of hydrogenation of olefin, the degree of hydrogenation of aromatic ring, the weight average molecular weight (Mw), the Z-average molecular weight (Mz), the ratio of the Z-average molecular weight to the weight average molecular weight (Mz/Mw), the Gardner color scale, and the difference between the pre-modified and post-modified mixed aniline point (MMAP), and also, had low odor intensity, high adhesive properties such as loop tackiness and peeling adhesion strength, and excellent heat stability.

The invention claimed is:

1. A modified hydrocarbon resin obtained by hydrogenating a hydrocarbon resin comprising:
   a 1,3-pentadiene monomeric unit of 20 mass % to 70 mass %,
   a $C_{4-6}$ alicyclic monoolefin monomeric unit of 10 mass % to 35 mass %,
   a $C_{4-8}$ acyclic monoolefin monomeric unit of 5 mass % to 30 mass %,
   an alicyclic diolefin monomeric unit of 0 mass % to 1 mass %, and
   an aromatic monoolefin monomeric unit of 0 mass % to 40 mass %,
   the modified hydrocarbon resin being characterized in that:
   a degree of hydrogenation of the olefins is within a range of 30% to 80%;
   a degree of hydrogenation of the aromatic rings, if an aromatic monomeric unit is included, is within a range of 5% to 20%;
   a weight average molecular weight (Mw) is within a range of 1,000 to 4,000;

a Z-average molecular weight (Mz) is within a range of 2,500 to 10,000;

a ratio (Mz/Mw) of the Z-average molecular weight to the weight-average molecular weight is within a range of 1.5 to 2.5;

a Gardner color scale of a toluene solution of 50 mass % is 2 or lower; and a difference between pre-hydrogenation and post-hydrogenation mixed aniline point (MMAP) is 5° C. or less.

2. A hot melt adhesive composition characterized by comprising:

the modified hydrocarbon resin according to claim 1, and a thermoplastic polymer compound.

3. The hot melt adhesive composition according to claim 2, characterized in that the thermoplastic polymer compound is a styrene-based block copolymer.

4. The hot melt adhesive composition according to claim 2, characterized in that the hot melt adhesive composition contains a compound including a 2,2,6,6-tetraalkyl-4-piperidyl group as an antioxidant.

5. The hot melt adhesive composition according to claim 2, characterized in that the hot melt adhesive composition contains a single perfume of which boiling point under normal pressure is 200° C. or more or a compound perfume comprising two or more kinds of the single perfume, as a perfume.

6. The hot melt adhesive composition according to claim 2, characterized in that the hot melt adhesive composition contains an absorbent.

* * * * *